(12) United States Patent
Lin et al.

(10) Patent No.: US 8,412,535 B2
(45) Date of Patent: Apr. 2, 2013

(54) NEGOTIATION SUPPORT SYSTEMS AND METHODS

(75) Inventors: June-Ray Lin, Dali (TW); Hung-Wen Tung, Zhongli (TW)

(73) Assignee: Institute of Information Industry, Daan Chiu, Taipei (TW)

( * ) Notice: Subject to any disclaimer, the term of this patent is extended or adjusted under 35 U.S.C. 154(b) by 2087 days.

(21) Appl. No.: 11/005,461

(22) Filed: Dec. 6, 2004

(65) Prior Publication Data

US 2006/0085362 A1 Apr. 20, 2006

(30) Foreign Application Priority Data

Oct. 15, 2004 (TW) .............................. 93131315 A

(51) Int. Cl.
*G06Q 10/00* (2012.01)
*G06Q 50/00* (2012.01)
(52) U.S. Cl. .......................... 705/1.1; 705/311
(58) Field of Classification Search ............... 705/1, 1.1, 705/311
See application file for complete search history.

(56) References Cited

U.S. PATENT DOCUMENTS

| | | | |
|---|---|---|---|
| 5,495,412 A * | 2/1996 | Thiessen | 705/1 |
| 6,611,501 B1 * | 8/2003 | Owen et al. | 370/254 |
| 2003/0163406 A1 * | 8/2003 | Thiessen et al. | 705/37 |
| 2004/0088264 A1 * | 5/2004 | Preist et al. | 705/80 |
| 2004/0148310 A1 * | 7/2004 | Preist et al. | 707/102 |
| 2005/0144050 A1 * | 6/2005 | Trent | 705/7 |

OTHER PUBLICATIONS

Mark Klein et al., Protocols for Negotiating Complex Contracts, 2003, IEEE Intelligent Systems, pp. 3238.*
Arvind Rangaswamy et al., Using Computers to Realize Joint Gains in Negotiations: Toward an "Electronic Bargaining Table", Aug. 1997, Management Science, vol. 43, No. 8, p. 1147.*

* cited by examiner

*Primary Examiner* — Fonya Long
(74) *Attorney, Agent, or Firm* — McClure, Qualey & Rodack, LLP

(57) ABSTRACT

Systems for negotiation support. First and second negotiation agent modules respectively receive multiple first proposals, calculate preference scores (PSs) for each first proposal using utility models and select a portion of the first proposals as second proposals in descending order according to the calculated PSs therewith. The negotiation management module receives the second proposals from the first and second negotiation modules, and generates third proposals according to the received proposals. The first and second negotiation agent modules respectively receive the third proposals, calculate PSs for received proposals using utility models, and arrange the third proposals in descending order according to PSs therewith to generate voting results. The negotiation management module receives the voting results, and generates a final agreement according to the received voting results.

14 Claims, 5 Drawing Sheets

NEGOTIATION SUPPORT SYSTEMS AND METHODS

BACKGROUND

The invention relates to decision-making, and more particularly, to systems and methods of negotiation support.

Electronic negotiations (e-negotiations) are becoming an important research subject in the area of electronic commerce (e-commerce). The Agent-Mediated Electronic Commerce (AMEC) laboratory of MIT, for instance, puts e-negotiations at the center of its Consumer Buying Behavior (CBB) model for e-commerce. The model identifies six steps in an e-commerce transaction, identification of the need, product brokering, merchant brokering, negotiation, purchase and delivery and service evaluation. Auctions are at present the most visible type of e-negotiations on the Internet as conducted by eBay. Application of e-negotiations is not limited to e-commerce but also exists in various decision support systems.

E-negotiations can take a complex form called bargaining. It involves making proposals and counter-proposals until an agreement is reached. Bargaining can be bilateral and multilateral negotiation depending on whether there are two parties (one-to-one bargaining) or many parties (many-to-many bargaining) involved in the negotiation. Negotiations are further classified as distributive or integrative. In distributive negotiations, only one issue (e.g. price) is negotiable. The parties have opposing interests. One party (e.g. buyer) tries to minimize and the other party (e.g. seller) tries to maximize the price. In integrative negotiations, multiple issues (e.g. price, quality, delivery date or others) are negotiable. If all issues are negotiable then a customer may hope to get a cheap price if she can live with a poorer quality and/or can stand a long delivery time. In this case, parties do not necessarily have opposing interests since they try to optimize different issues. Integrative negotiation, however, is time-consuming and difficult to achieve optimize satisfactions among parties.

SUMMARY

Systems for negotiation support are provided. An exemplary embodiment comprises a first negotiation agent module, a second negotiation agent module and a negotiation management module. The first negotiation agent module receives multiple first proposals, calculates a first preference score (PS) for each first proposal using a first utility model and selects a portion of the first proposals as second proposals in descending order according to the first PSs therewith. The second negotiation agent module receives the first proposals, calculates a second preference score (PS) for each first proposal using a second utility model and selects a portion of the first proposals as third proposals in descending order according to the second PSs therewith. The negotiation management module receives the second proposals from the first negotiation module and the third proposals from the second negotiation module, and generates the fourth proposals according to the second proposals and the third proposals. The first negotiation agent module receives the fourth proposals generated by the negotiation management module, calculates a third PS for each fourth proposal using the first utility model, and arranges the fourth proposals in descending order according to third PSs therewith to generate a first voting result. The second negotiation agent module receives the fourth proposals generated by the negotiation management module, calculating a fourth PS for each fourth proposal using the second utility model, and arranging the fourth proposals in descending order according to the fourth PSs therewith to generate a second voting result. The negotiation management module receives the first voting result from the first negotiation module and the second voting result from the second negotiation module, and generates a final agreement according to the first voting result and the second result.

Negotiation support methods are further provided. An exemplary method generates multiple first proposals, receives multiple second proposals being a portion of the first proposals, and third proposals being a portion of the first proposals, generates multiple fourth proposals according to the second proposals and the third proposals, receives a first voting result corresponding to a portion of the fourth proposals, and a second voting result corresponding to a portion of the fourth proposals, and determines one of the fourth proposals as a final agreement according to the first voting result and the second voting result.

A machine-readable storage medium storing a computer program which, when executed, performs the method of negotiation support is also provided.

BRIEF DESCRIPTION OF THE DRAWINGS

Negotiation support systems and methods will become apparent by referring to the following detailed description of embodiments with reference to the accompanying drawings, wherein.

DESCRIPTION

Figure 1:
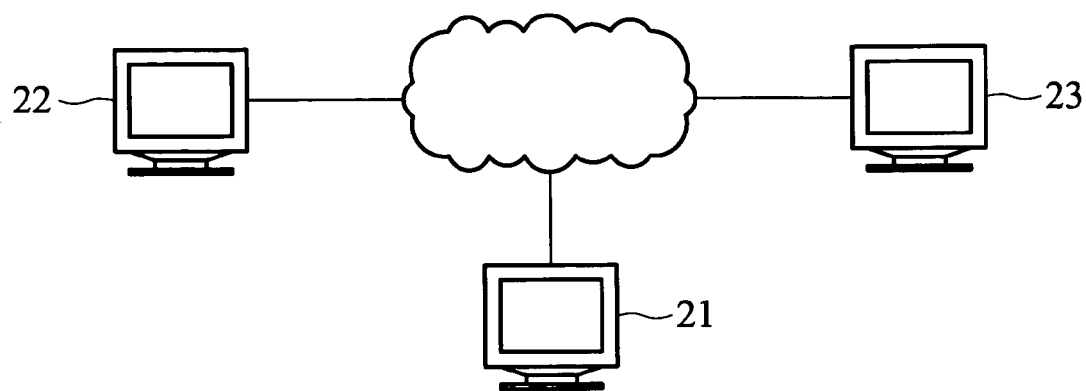
FIG. 1 is a diagram of an embodiment of a negotiation support system.

FIG. 1 is a diagram of an embodiment of a negotiation support system, comprising negotiation server 21, computers 22 and 23, operating in a network (preferably Internet or intranet) using logical connections to each other. Those skilled in the art will recognize that the negotiation server 21, computers 22 and 23 may be connected in different types of networking environments, and communicate between different types of networking environments through various types of transmission devices such as routers, gateways, access points, base station systems or others.

Figure 2:
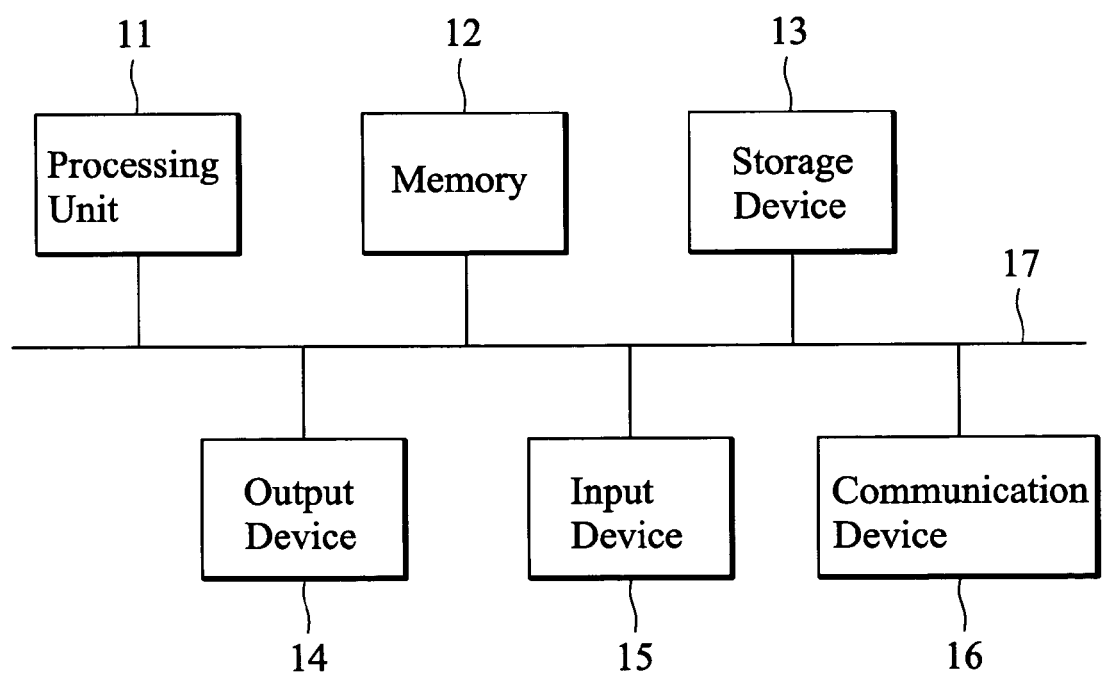
FIG. 2 is a diagram of a hardware environment applicable to negotiation server and computers in an embodiment of a negotiation support system.

FIG. 2 is a diagram of a hardware environment applicable to negotiation server and computers in an embodiment of a negotiation support system, comprising a processing unit 11, a memory 12, a storage device 13, an input device 14, an output device 15 and a communication device 16. The processing unit 11 is connected by buses 17 to the memory 12, storage device 13, input device 14, output device 15 and communication device 16 based on Von Neumann architecture. There may be one or more processing units 11, such that the processor of the computer comprises a single central processing unit (CPU), a micro processing unit (MPU) or multiple processing units, commonly referred to as a parallel processing environment. The memory 12 is preferably a random access memory (RAM), but may also include read-only memory (ROM) or flash ROM. The memory 12 preferably stores program modules executed by the processing unit 11 to perform Web link management functions. Generally, program modules include routines, programs, objects, components, scripts, Web pages, or others, that perform particular tasks or implement particular abstract data types. Moreover, those skilled in the art will understand that some embodiments may be practiced with other computer system configurations, including hand-held devices, multiprocessor-based, microprocessor-based or programmable consumer electronics, network PCs, minicomputers, mainframe computers, and the like. Some embodiments may also be practiced in distributed computing environments where tasks are performed by remote processing devices linked through a communication network. In a distributed computing environment, program modules may be located in both local and remote memory storage devices based on various remote access architecture such as DCOM, CORBA, Web objects, Web Services or other similar architectures. The storage device 13 may be a hard drive, magnetic drive, optical drive, portable drive, or non-volatile memory drive. The drives and associated computer-readable media thereof (if required) provide nonvolatile storage of computer-readable instructions, data structures and program modules. The processing unit 11, controlled by program modules received from the memory 12 and from an operator through the input device, directs negotiation support functions.

Figure 3:
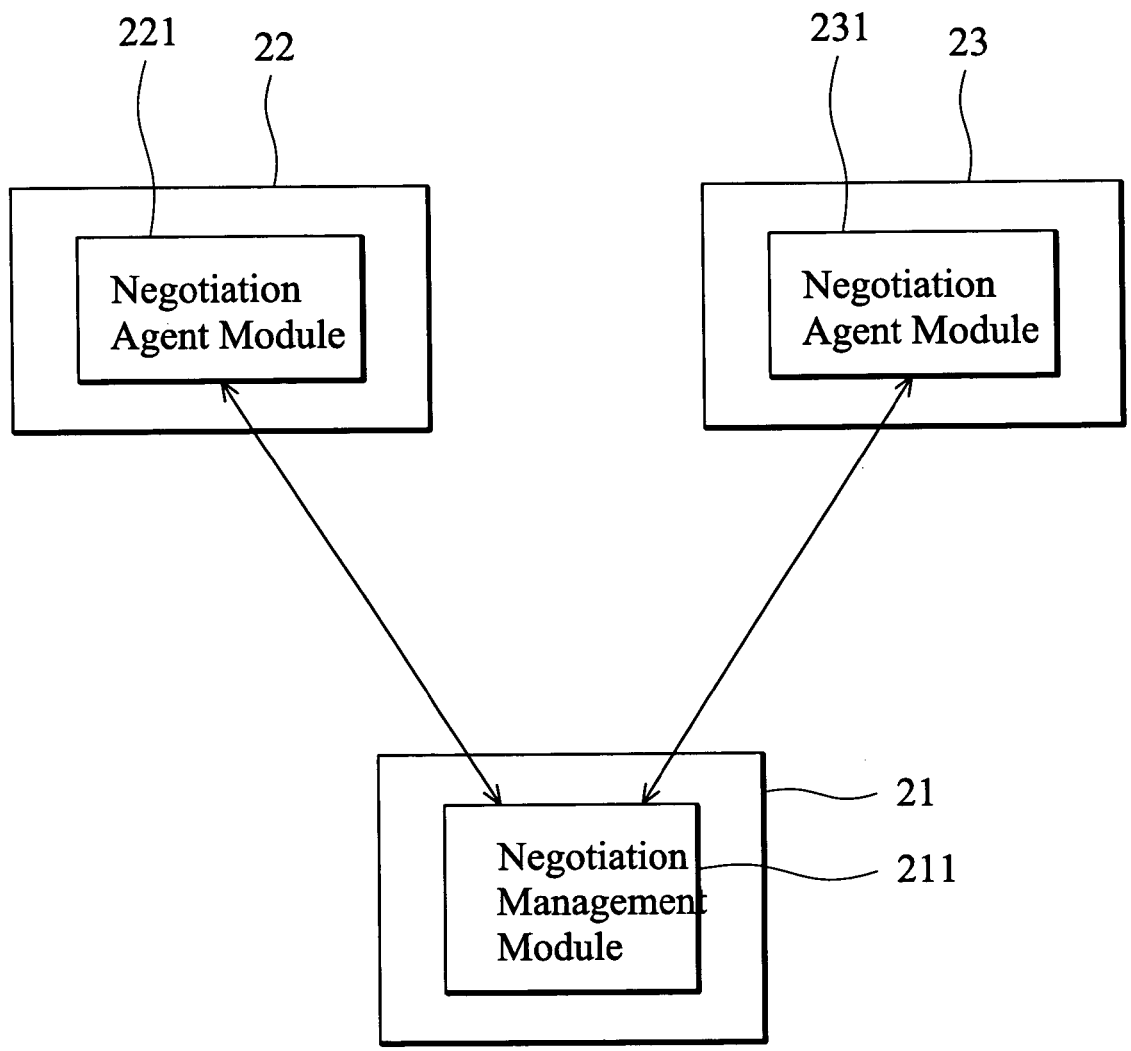
FIG. 3 is a software architecture diagram of an embodiment of a negotiation support system.

FIG. 3 is a software architecture diagram of an embodiment of a negotiation support system. Computers 22 and 23 individually comprise a negotiation agent module 221 and 231, and the negotiation server 21 comprises a negotiation management module 211 communicating with the negotiation agent modules 221 and 231. The negotiation agent modules 221 and 231 are individually stored in memories 12 of computers 22 and 23, and individually loaded and executed by processing units 11 of computer 22 and 23. The negotiation management module 211 is stored in memory 12 of negotiation server 21, and loaded and executed by the processing unit 11 of negotiation server 21. Note that the negotiation agent module 221 or 231 may be stored in the negotiation server 21. Those skilled in the art will recognize that a negotiation system may comprise more than two negotiation agent modules. Negotiation content comprises multiple issues, with each issue associated with multiple items.

Figure 4A:
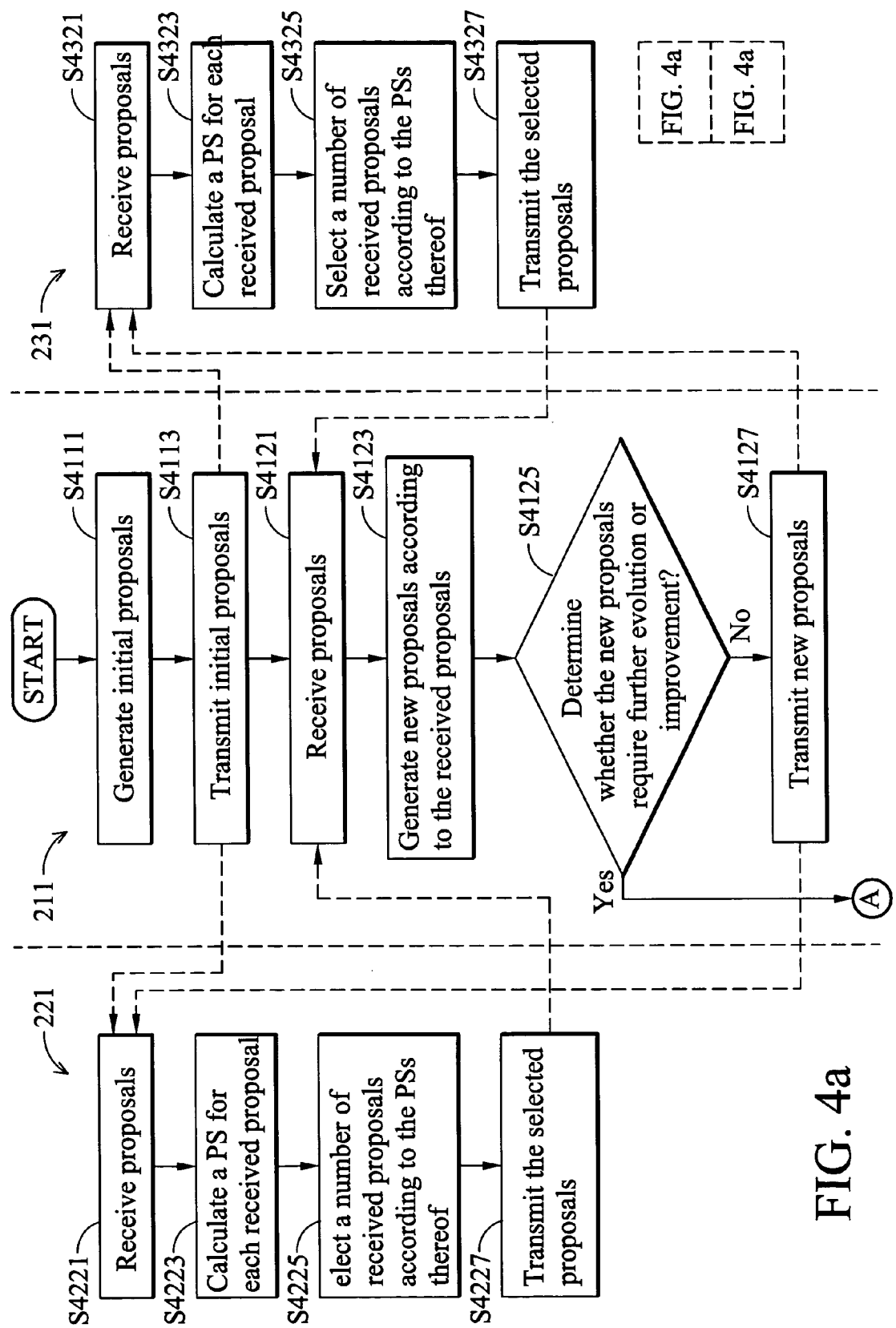
FIG. 4 is a flowchart of an embodiment of a method for negotiation support.
Figure 4B:
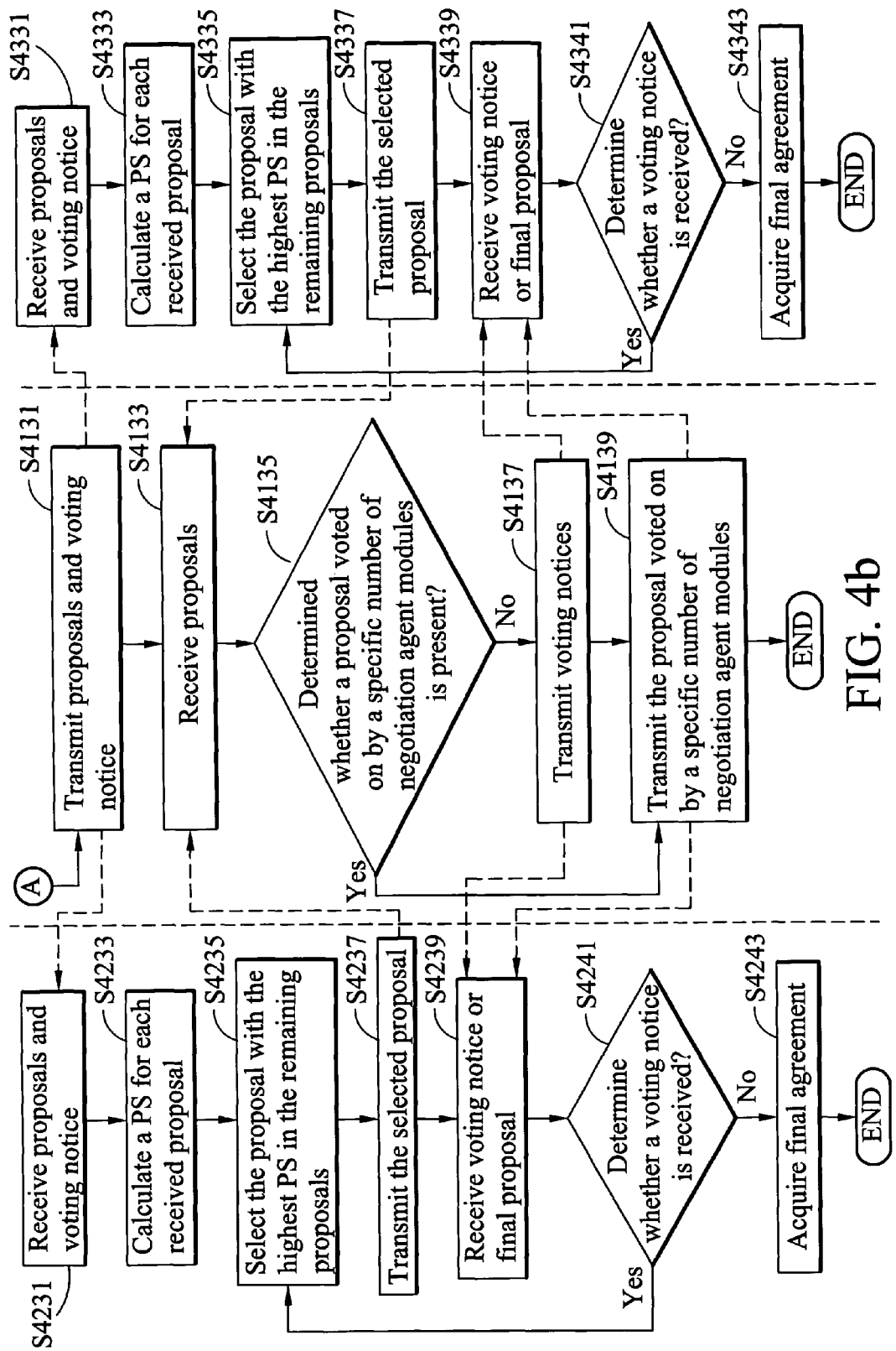

FIG. 4 is a flowchart of an embodiment of a method for negotiation support, divided into three sections, a left section showing steps performed by the negotiation agent module 221, a middle section showing steps performed by the negotiation management module 221, and a right section showing steps performed by the negotiation agent module 231, separated by dashed lines for added clarity.

In step S4111, multiple initial proposals are generated by the negotiation management module 211. Items for specific issues in each initial proposal are randomly selected. In step S4221, the initial proposals are transmitted to the negotiation agent modules 221 and 231.

In step S4221, the proposals initially generated by the negotiation management module 211 are received by the negotiation agent module 221. In step S4223, a preference score (PS) for each received proposal is calculated according to a predetermined utility model for the negotiation agent module 221. The implementation of the utility model may utilize at least one mathematic equation. In step S4225, a number of received proposals are selected in descending order according to the PSs thereof. In step S4227, the selected proposals are transmitted to the negotiation management module 211.

In step S4321, the proposals initially generated by the negotiation management module 211 are received by the negotiation agent module 231. In step S4323, a PS for each received proposal is calculated according to a predetermined utility model for the negotiation agent module 231. The implementation of the utility model may utilize at least one mathematic equation. In step S4325, a number of received proposals are selected in descending order according to the PSs thereof. In step S4327, the selected proposals are transmitted to the negotiation management module 211.

In step S4121, proposals selected by the negotiation agent modules 221 and 231 are received by the negotiation management module 211. In step S4123, new proposals are generated according to the received proposals, preferably in a number equaling to that of received proposals. Some embodiments may perform recombination processes of Genetic Algorithm (GA) to selectively combine more than two received proposals to generate new proposals. During the recombination process, two selected proposals may be split at a point randomly chosen to produce two "head" sub-proposals and two "tail" sub-proposals. The "head" sub-proposals of proposals are respectively combined with the "tail" sub-proposals of the other proposals to produce new proposals. Some embodiments may perform mutation processes of GA to selectively change item in at least one issue for each received proposals to generate new proposals. Some embodiments may first perform mutation processes of GA and subsequently perform recombination processes of genetic algorithm to generate new proposals. Some embodiments may first perform recombination processes of genetic algorithm and subsequently perform mutation processes of GA to generate new proposals. Some embodiments may perform other various well-known search algorithms or random optimization algorithms to generate new proposals. Preferably, if the number of generated proposals exceeds the number of received proposals, some generated proposals are randomly removed from the generated proposals to maintain the generated proposal size. In step S4125, it is determined whether the new proposals require further evolution or improvement. If so, the process proceeds to step S4127, and otherwise, the process proceeds to step S4131. Some embodiments may determine whether the rounds of new proposal generation exceeds to a predetermined threshold. Some embodiments may determine whether the new proposals are required to improve or evolve according to content thereof. In step S4131, the generated proposals are transmitted to the negotiation agent modules 221 and 231. In step S4131, the generated proposals and voting notices are transmitted to the negotiation agent modules 221 and 231.

In step S4231, the proposals and voting notice generated by the negotiation management module 211 are received by the negotiation agent module 221. In step S4233, a PS for each received proposal is calculated according to the predetermined utility model for the negotiation agent module 221. In step S4235, the proposal with the highest PS in the remaining proposals (i.e. proposals not yet voted on by the negotiation agent module 221) is selected. In step S4237, the selected proposal or proposal identity is transmitted as a voting result to the negotiation management module 211.

In step S4331, the proposals and voting notice generated by the negotiation management module 211 are received by the negotiation agent module 231. In step S4333, a PS for each received proposal is calculated according to the predetermined utility model for the negotiation agent module 231. In step S4335, the proposal with the highest PS in the remaining proposals (i.e. proposals not yet voted on by the negotiation agent module 231) is selected. In step S4337, the selected proposal or proposal identity is transmitted as a voting result to the negotiation management module 211.

In step S4133, proposals or proposal identities are received from the negotiation agent modules 221 and 231. In step S4133, it is determined whether a proposal voted on by a specific number of negotiation agent modules is present. If so, the process proceeds to step S4139, and otherwise, the process proceeds to step S4137. In step S4137, a voting notice is transmitted to the negotiation agent modules 221 and 231. In step S4139, a proposal voted on by a specific number of negotiation agent modules (i.e. final proposal) is transmitted as a final result to the negotiation agent modules 221 and 231. Although a preferred embodiment discloses a voting procedure in rounds as steps S4133 to S4139, those skilled in the art will recognize that the negotiation management module 211 may receive more than two proposals or proposal identities with priorities at one time and accordingly determine a final result, enabling reduced process time.

In step S4239, a voting notice or a final proposal generated by the negotiation management module 211 is received by the negotiation agent module 221. In step S4241, it is determined whether a voting notice is received. If so, the process proceeds to step S4235, and otherwise, the process proceeds to step S4243. In step S4243, the received proposal is acquired as a final agreement.

In step S4339, a voting notice or a final proposal is received by the negotiation agent module 231. In step S4341, it is determined whether a voting notice is received. If so, the process proceeds to step S4335, and otherwise, the process proceeds to step S4343. In step S4343, the received proposal is acquired as a final agreement.

Details of the method for negotiation support are illustrated in the following example. A travel proposal comprises multiple issues, such as activity, restaurant, hotel and the like. The activity comprises items A1, A2 and A3, the restaurant comprises items R1, R2, R3, R4 and R5, and the hotel comprises items H1, H2 and H3. In steps S4111 and S413, multiple initial proposals, P1={A3,R2,H3}, P2={A1,R5,H2}, P3={A2,R4,H2}, P4={A2,R3,H2}, P5={A1,R1,H1}, P6={A3,R1,H1}, are generated by the negotiation management module 211, and transmitted to the negotiation agent modules 221 and 231.

In steps S4221 and S4223, proposals initially generated by the negotiation management module 211 are received by the negotiation agent module 221, and PSs for received proposals are calculated by formula 1:

$$PS = \sum_{i=1}^{n} Wi * S(i, j),$$

where n represents the number of issues, Wi represents the ith weighted value, and S(i,j) represents the score of the jth item in the ith issue. Where Wpb 1=3, W2=2, W3=1, S(1,1)=¼, S(1,2)=1, S(1,3)=½, S(2,1)=1, S(2,2)=1/10, S(2,3)=1/10, S(2,4)=1/10, S(2,5)=1/10, S(3,1)=1, S(3,2)=1 and S(3,3)=1, PSs for initial proposals P1 to P6 are 2.7, 1.95, 4.2, 4.2, 3.75 and 4.5. In steps S4225 and S4227, three proposals P6, P3 and P4 are selected in descending order according to PSs therewith, and transmitted to the negotiation agent module 211.

In steps S4321 and S4323, proposals initially generated by the negotiation management module 211 are received by the negotiation agent module 231, and PSs for received proposals are calculated by formula 2:

$$PS = \sum_{i=1}^{n} S(i, j),$$

where n represents the number of issues, and S(i,j) represents the score of the jth item in the ith issue. Where S(1,1)=1, S(1,2)=3, S(1,3)=2, S(2,1)=5, S(2,2)=2, S(2,3)=4, S(2,4)=1, S(2,5)=3, S(3,1)=2, S(3,2)=3 and S(3,3)=1, PSs for initial proposals P1 to P6 are 5, 5, 7, 10, 8 and 9. In steps S4325 and S4327, three proposals P4, P6 and P5 are selected in descending order according to PSs therewith, and transmitted to the negotiation agent module 211.

In steps S4121 to S4127, proposals P6, P3, P4, P4, P6 and P5 selected by the negotiation agent modules 221 and 231 are received by the negotiation management module 211. New proposals, P7={A3,R1,H2}, P8={A2,R3,H1}, P9={A2,R1,H1}, P10={A3,R4,H2}, P11={A2,R3,H1} and P12={A1,R1,H2}, are generated by performing recombination processes of GA for pairs of received proposals {P6,P4}, {P3,P6} and {P4,P5}. The new generated proposals are transmitted to negotiation agent modules 221 and 231.

In steps S4221 and S4223, proposals generated by the negotiation management modules 211 are received by the negotiation agent module 221. The PSs for received proposals are calculated by the utility module in formula 1. The resulting PSs are 4.5, 4.2, 6, 3.7, 4.2 and 3.75 for the received proposals, P7 to P12. In steps S4225 and S4227, three proposals P9, P7 and P8, are selected in descending order according to PSs therewith, and transmitted to the negotiation management module 211.

In steps S4321 and S4323, proposals generated by the negotiation management modules 211 are received by the negotiation agent module 231. The PSs for received proposals are calculated by the utility module in formula 2. The resulting PSs are 10, 9, 10, 6, 9 and 9 for the received proposals P7 to P12. In steps S4325 and S4327, three proposals P7, P9 and P8 are selected in descending order according to PSs therewith, and transmitted to the negotiation management module 211.

In steps S4121 and S4123, proposals P9, P7, P8, P7, P9 and P8 selected by the negotiation agent modules 221 and 231 are received by the negotiation management module 211. New proposals, P13={A3,R1,H1}, P14={A2,R3,H1}, P15={A2,R3,H1}, P16={A2,R1,H1}, P17={A3,R1,H1} and P18={A1,R1,H2}, are generated by performing recombination processes of GA for pairs of received proposals {P7,P8}, {P8,P9} and {P7,P9}. In steps S4125 and S4131, the new generated proposals and voting notices are transmitted to negotiation agent modules 221 and 231.

In steps S4221 and S4223, proposals generated by the negotiation management modules 211 are received by the negotiation agent module 221. The PSs for received proposals are calculated by the utility module in formula 1. The resulting PSs are 4.5, 4.2, 4.2, 6, 4.5 and 6 for the received proposals P13 to P18. In steps S4321 and S4323, proposals generated by the negotiation management modules 211 are received by the negotiation agent module 231. The PSs for received proposals are calculated by the utility module in formula 2. The resulting PSs are 9, 10, 9, 10, 9 and 11 for the received proposals P13 to P18.

During a first voting round, in steps S4237 and S4239, the proposal P16 is selected and transmitted to the negotiation management module 211. In steps S4337 and S4339, the proposal P18 is selected and transmitted to the negotiation management module 211. In steps 4135 and S4137, voting notices are transmitted to the negotiation agent modules 221 and 231 by the negotiation management module 211.

During a second voting round, in steps S4237 and S4239, the proposal P18 is selected and transmitted to the negotiation management module 211. In steps S4337 and S4339, the proposal P14 is selected and transmitted to the negotiation management module 211. In steps 4135 and S4137, the proposal P18 is transmitted to the negotiation agent modules 221 and 231 by the negotiation management module 211.

Finally, in step S4243, the proposal P18 is acquired as a final agreement by the negotiation agent module 221. In step S4343, the proposal P18 is acquired as a final agreement by the negotiation agent module 231.

Figure 5:
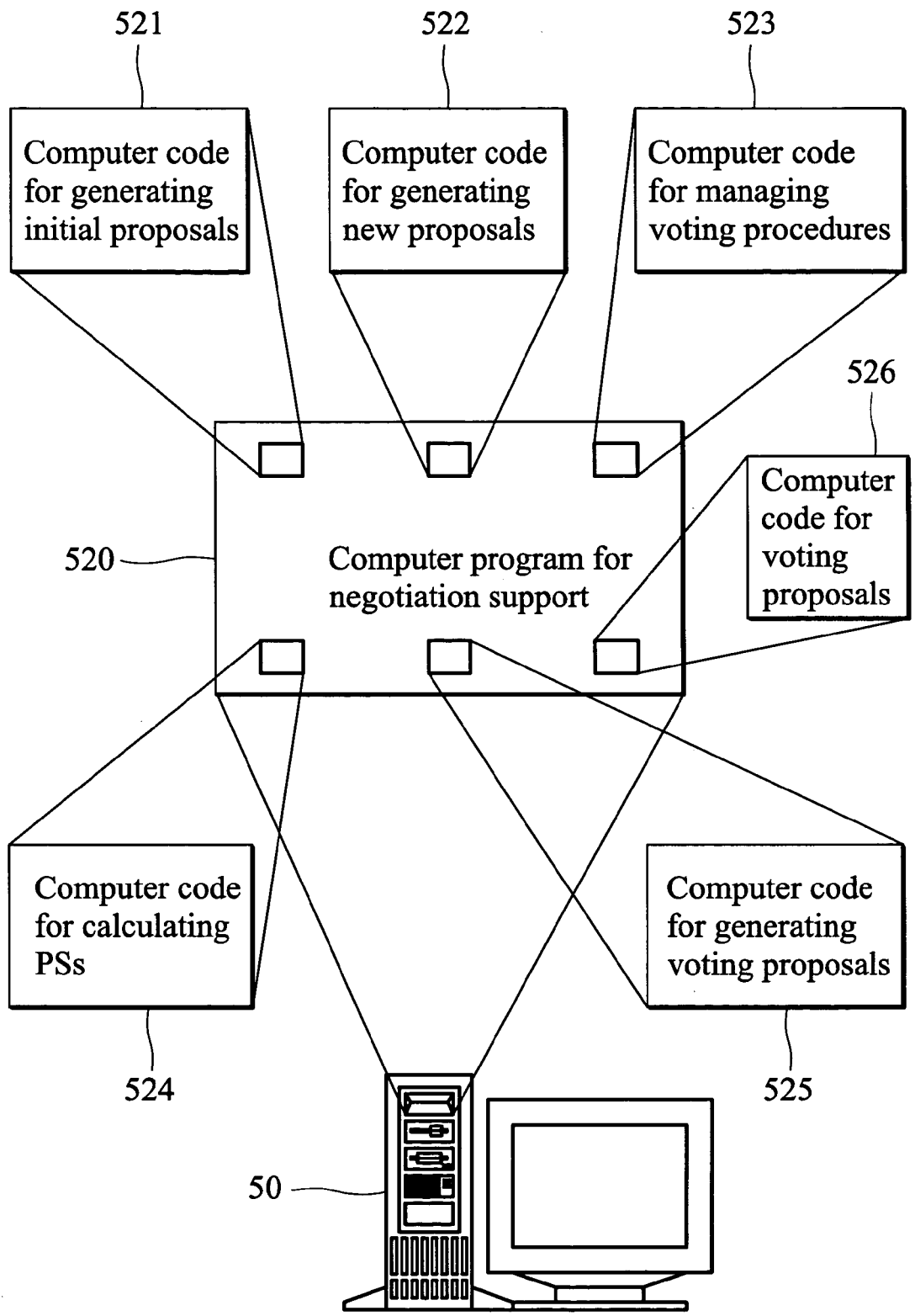
FIG. 5 is a diagram of a storage medium storing a computer program providing an embodiment of a method of negotiation support.

Also disclosed is a storage medium as shown in FIG. 5 storing a computer program 520 providing the disclosed method of negotiation support. The computer program product includes a storage medium 50 having computer readable program code embodied therein for use in a computer system. The computer readable program code comprises at least computer readable program code 521 generating initial proposals, computer readable program code 522 generating new proposals, computer readable program code 523 managing voting procedures, computer readable program code 524 calculating PSs, computer readable program code 525 generating voting proposals, and computer readable program code 526 voting proposals.

Negotiation support systems and methods, or certain aspects or portions thereof, may take the form of program code (i.e., instructions) embodied in tangible media, such as floppy diskettes, CD-ROMS, hard drives, or any other machine-readable storage medium, wherein, when the program code is loaded into and executed by a machine, such as a computer, the machine becomes an apparatus for practicing the invention. The disclosed methods and systems may also be embodied in the form of program code transmitted over some transmission medium, such as electrical wiring or cabling, through fiber optics, or via any other form of transmission, wherein, when the program code is received and loaded into and executed by a machine, such as a computer, the machine becomes an apparatus for practicing the invention. When implemented on a general-purpose processor, the program code combines with the processor to provide a unique apparatus that operates analogously to specific logic circuits.

Although the invention has been described in terms of preferred embodiment, it is not limited thereto. Those skilled in this technology can make various alterations and modifications without departing from the scope and spirit of the invention. Therefore, the scope of the invention shall be defined and protected by the following claims and their equivalents.

What is claimed is:

1. A system for negotiation support, comprising:
a first computer, comprising a first negotiation agent module receiving a plurality of first proposals, calculating a first preference score (PS) for each first proposal using a first utility model, selecting a portion of the first proposals as a plurality of second proposals in descending order according to the first PSs therewith, receiving a plurality of third proposals, calculating a second PS for each third proposal using the first utility model, and arranging the third proposals in descending order according to second PSs therewith to generate a first voting result;
a second computer, comprising a second negotiation agent module receiving the first proposals, calculating a third preference score (PS) for each first proposal using a second utility model, selecting a portion of the first proposals as a plurality of fourth proposals in descending order according to the third PSs therewith, receiving the third proposals, calculating a fourth PS for each third proposal using the second utility model, and arranging the third proposals in descending order according to the fourth PSs therewith to generate a second voting result; and
a negotiation server, comprising a negotiation management module receiving the second proposals from the first negotiation module and the fourth proposals from the second negotiation module, generating the third proposals according to the second proposals and the fourth proposals, receiving the first voting result from the first negotiation module and the second voting result from the second negotiation module, and generating a final agreement according to the first voting result and the second result.

2. The system of claim 1 wherein the first negotiation agent module communicates with the negotiation management module via network.

3. The system of claim 1 wherein the second negotiation agent module communicates with the negotiation management module via network.

4. The system of claim 1 wherein the first utility model and the second utility model respectively use at least one formula to calculate the PSs according to selected items for issues in the proposals.

5. The system of claim 1 wherein the negotiation management module uses recombination process or mutation process of Genetic Algorithm (GA) to generate the third proposals.

6. The system of claim 1 wherein the negotiation management module generates the first proposals.

7. The system of claim 6 wherein at least one item for each issue in the first proposals is randomly selected.

8. A method for negotiation support, loaded and executed by a processing unit, comprising:
the processing unit generating a plurality of first proposals;
the processing unit receiving a plurality of second proposals being a portion of the first proposals;
the processing unit receiving a plurality of third proposals being a portion of the first proposals;
the processing unit generating a plurality of fourth proposals according to the second proposals and the third proposals;
the processing unit receiving a first voting result corresponding to a portion of the fourth proposals;
the processing unit receiving a second voting result corresponding to a portion of the fourth proposals; and
the processing unit determining one of the fourth proposals as a final agreement according to the first voting result and the second voting result;
wherein:
the second proposals are determined by a first negotiation agent module;
the third proposals are determined by a second negotiation module;
the first negotiation agent module calculates a first preference score (PS) for each first proposal using a first utility model and selects a portion of the first proposals as the second proposals in descending order according to the first PSs therewith, and the second negotiation agent module calculates a second PS for each first proposal using a second utility model and selects a portion of the first proposals as the third proposals in descending order according to the second PSs therewith.

9. The method of claim 8 wherein the first utility model and the second utility model respectively use at least one formula to calculate the PSs according to selected items for issues in the proposals.

10. The method of claim 8 wherein the fourth proposals are generated using recombination process or mutation process of Genetic Algorithm (GA).

11. The method of claim 8 wherein the first voting result is generated by a first negotiation agent module, and the second voting result is generated by a second negotiation module.

12. The method of claim 11 wherein the first negotiation agent module calculates a first preference score (PS) for each fourth proposal using the first utility model and arranges the fourth proposals in descending order according to the first PSs therewith to generate the first voting result, and the second negotiation agent module calculates a second PS for each fourth proposal using the second utility model and arranges the fourth proposals in descending order according to the second PSs therewith to generate the second voting result.

13. The method of claim 8 wherein at least one item for each issue in the first proposals is randomly selected.

14. A machine-readable storage medium storing a computer program which, when executed, performs a method for negotiation support comprising:
   generating a plurality of first proposals;
   receiving a plurality of second proposals being a portion of the first proposals;
   receiving a plurality of third proposals being a portion of the first proposals
   generating a plurality of fourth proposals according to the second proposals and the third proposals
   receiving a first voting result corresponding to a portion of the fourth proposals;
   receiving a second voting result corresponding to a portion of the fourth proposals; and
   determining one of the fourth proposals as a final agreement according to the first voting result and the second voting result;
   wherein:
   the second proposals are determined by a first negotiation agent module;
   the third proposals are determined by a second negotiation module;
   the first negotiation agent module calculates a first preference score (PS) for each first proposal using a first utility model and selects a portion of the first proposals as the second proposals in descending order according to the first PSs therewith, and the second negotiation agent module calculates a second PS for each first proposal using a second utility model and selects a portion of the first proposals as the third proposals in descending order according to the second PSs therewith.

* * * * *